June 10, 1969 R. S. DAUGHENBAUGH ET AL 3,449,747
IMPACT-ACTUATED OBJECT LOCATOR

Filed Dec. 14, 1967 Sheet 1 of 3

INVENTORS
RAYMOND S. DAUGHENBAUGH
CHARLES A. HENNESSEY
FRANCIS M. HOLMES
SAMUEL E. LAGER

BY Howard J. Murray, Jr. AGENT
Q. Baxter Warner
ATTORNEY

United States Patent Office 3,449,747
Patented June 10, 1969

3,449,747
IMPACT-ACTUATED OBJECT LOCATOR
Raymond S. Daughenbaugh, 4601 South B St., Oxnard, Calif. 93030; Charles A. Hennessey, U.S. Naval Ammunition Depot, McAlester, Okla. 74501; Francis M. Holmes, 28625 Trailriders Drive, Palos Verdes Peninsula, Calif. 90274, and Samuel E. Lager, 385 LaCumbre Road, Somis, Calif. 93066
Filed Dec. 14, 1967, Ser. No. 690,591
Int. Cl. G01s 7/36, 7/42
U.S. Cl. 343—18    10 Claims

ABSTRACT OF THE DISCLOSURE

The present invention relates to apparatus for marking the position of a disabled vehicle in order to facilitate the recovery thereof. The invention is particularly applicable for use at sea in order to locate a sunken ship or a disabled submarine. In a preferred embodiment, the invention is directed to apparatus which is automatically released when an underwater vehicle sustains an impact of predetermined magnitude or descends beyond a predetermined depth, such apparatus including a buoyant member which rises to the surface. At such time, a built-in foam-generating apparatus is activated to fill a meteorological balloon containing internal reflectors of microwave energy, the foam then hardening to form a practically indestructible assembly. The inernal energy reflectors render the unit readily detectable by a search radar, and hence recovery of the sunken vehicle is expedited.

---

The invention described herein may be manufactured and used by or for the Government of the United States of America for governmental purposes without the payment of any royalties thereon or therefor.

BACKGROUND OF THE INVENTION

It is obviously desirable to reach the scene of a disabled vehicle with a minimum of delay. This is especially true in the case of a submarine, where facilities for remaining below the surface for an extended period of time are generally limited. In exceptional cases, failure promptly to locate a sunken submarine can result in the loss of all members of the crew. Although the need for minimizing the time required for rescue operations has long been recognized, nevertheless previous methods for ascertaining the precise location of a sunken vehicle have not proven to be completely satisfactory. The problem is particularly acute when the disabled vehicle is at a depth such that reliable telephonic or radio communication with the surface is not feasible.

The distance from which a distress marker may be detected can be greatly extended by the use of radar. Although this is widely recognized, nevertheless conventional markers released from a sunken ship or submarine are usually poor radar reflectors, and the return "blip" therefrom is usually difficult to distinguish from background noise and sea clutter. One obvious solution to this problem is to design a marker of large dimensions so as to provide a reflecting surface of maximum area. This expedient is not usually practicable, however, since the unit must be carried on the ship or submarine during normal operation in a space which is usually quite limited. Furthermore, the weight of the unit, especially in the case of submarines, must be held to a minimum in order not to seriously detract from the range and maneuverability of the vessel. In addition, the unit of which the radar reflector forms a part must be highly buoyant in nature, since it is required to float on the surface of the ocean and remain tethered to the sunken vehicle for as long a time as may be necessary in order for the rescue operation to be carried out. Under severe weather conditions, extreme stresses may be developed, and the design of the marker must be such that its functioning is not adversely affected thereby. These requirements are such that heretofore no wholly satisfactory recovery unit has been devised.

SUMMARY OF THE INVENTION

The present concept is directed to a marking device which is automatically released from a vehicle when the latter sustains an impact of predetermined magnitude or descends beyond a given depth in a body of water. In the case of a sunken ship or disabled submarine, the marker is designed in the form of a buoyant member which rises to the surface and is attached to the vehicle by a cable. The buoyant member may incorporate a canister or container which includes a foam generator and an inflatable component such as a metereological balloon. The latter remains in a collapsed or deflated condition until such time as the container reaches the ocean's surface, at which time foam is generated which fills and expands the balloon into generally spherical form. Within the balloon are a plurality of planar elements which, when the balloon is fully inflated, are so angularly related to one another as to become sequential reflectors of microwave energy. An important feature of the concept is that the foam which fills the balloon is of a type which hardens within a relatively short period of time, so that the entire inflatable assembly (including the internal planar reflectors) becomes a fully rigidized unit which not only has excellent buoyant properties but in addition is practically incapable of being damaged by high waves or other turbulent weather conditions to which the marker may be subjected.

One object of the present invention, therefore, is to provide a device which is released from a disabled vehicle so as to mark the location thereof.

Another object of the invention is to provide a marker unit especially designed to facilitate the location and subsequent recovery of an underwater vehicle such as a submarine or torpedo.

A further object of the invention is to provide a marker unit for disabled vehicles which serves as a highly efficient reflector of microwave energy such as might be emitted by a search radar.

An additional object of the invention is to provide a microwave reflector unit which is brought into operative form following a disablement of the vehicle on which it is carried.

A still further object of the invention is to provide a microwave reflector unit which is rigidized in situ and hence rendered substantially incapable of damage even under adverse environmental conditions.

Other objects, advantages, and novel features of the invention will become apparent from the following detailed description of the invention when considered in conjunction with the accompanying drawings.

DESCRIPTION OF THE PREFERRED EMBODIMENT

Figures 1, 2, 3:
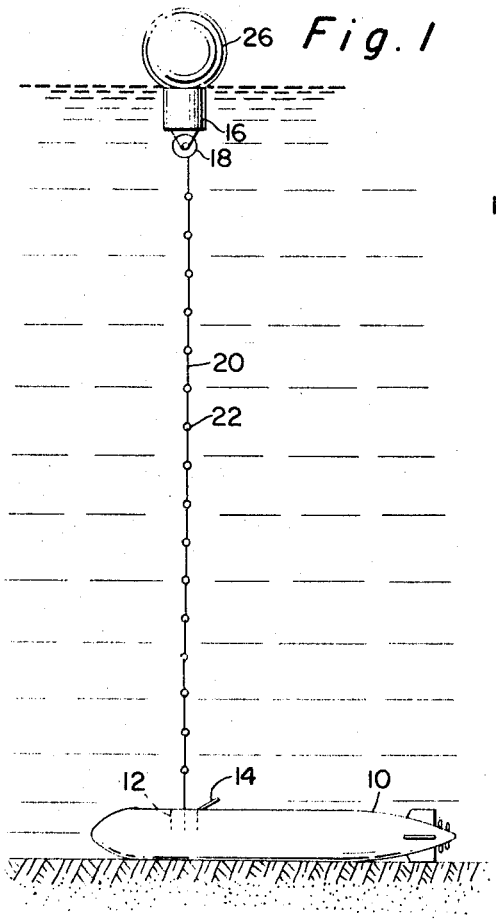
FIG. 1 is a somewhat schematic illustration of a preferred form of the present invention at a time when the marker assembly has been released from the vehicle upon which it is carried and has risen to the surface of a body of water.
FIG. 2 is an enlarged view of the marker unit of FIG. 1.
FIG. 3 is a partly sectional view of the marker assembly of FIGS. 1 and 2 before the inflatable member has been filled with foam, this condition being that which exists while the unit is rising to the surface after release from the vehicle upon which it is carried.

Referring now to the drawings, and particularly to FIGURES 1, 2 and 3 thereof, there is shown an object-locating device or marker designed in accordance with a preferred embodiment of the present invention. Although suitable for use with any type of vehicle, the invention device will be described in connection with a submarine or torpedo which may become disabled and hence come to rest upon the floor of the ocean or other body of water. As will later appear, the invention is especially applicable to situations where the vehicle suffers an impact of predetermined magnitude. At this point, however, it need only be recognized that the torpedo or submarine, generally identified by the reference number 10, has come to rest as shown in FIG. 1 and is incapable of further movement.

Although prompt location and subsequent recovery of the sunken vehicle is highly desirable, especially in the case of a manned submarine, nevertheless in many instances this has proven to be difficult of accomplishment. If the depth at which the disabled vehicle has come to rest is such that radio communication therefrom is uncertain or unreliable, it is difficult to "pinpoint" the exact position of the vehicle from the surface, and this obviously delays the rescue operation. Complete failure of radio communication following a collision can even prevent a rescue party from ascertaining the general region in which the mishap occurred. It is consequently essential to provide some visible indicator or marker which will lead a rescue party to the exact point on the surface where the rescue operation is to be carried out.

To achieve this objective, the vehicle, such as the torpedo 10 of FIG. 1, is designed with a compartment 12 in the upper portion thereof, such compartment being normally closed by a lid 14 forming part of the torpedo skin or surface covering. Within this compartment is stowed an emergency "marker" assembly made up of three items—(1) a container or canister 16 which is in effect a foam-generating unit best shown in FIG. 3, (2) a reel 18 (also best shown in FIG. 3) on which is wound a cable 20 preferably provided with small swivels 22 every 50 to 100 feet therealong, and (3) an inflatable bag of flexible material designated by the reference numeral 26. This bag 26 may comprise, for example, a meteorological balloon, which contains therewithin a microwave reflector assembly 30 the details of which will be set forth hereinafter. As best shown in FIG. 3, the reel 18 is rotatably mounted upon a framework 31 which is attached to the undersurface of the canister or foam-generating assembly 16. When the marker assembly of FIG. 3 is being carried within the compartment 12 of vehicle 10, the cable 20 is fully wound upon reel 18, the lower terminal portion of the cable 20 being secured to some rigid structural member of the vehicle as indicated in FIG. 1 of the drawings.

It is intended that the marker assembly above described be released from the vehicle on which it is carried after the latter is disabled in any manner, such as by sustaining an impact of predetermined magnitude or descending beyond a predetermined depth in a body of water. Many devices are known which become operative when either of the above-mentioned conditions exist, and any such suitable device may be employed in conjunction with the present disclosure. For example, a so-called "dead man's switch," having a built-in time delay, may be utilized in conjunction with a standard latch or release mechanism to open the lid or cover 14 of the compartment 12 shown in FIG. 1 of the drawings. This "dead man's switch" may, for example, comprise an inertia-barometric unit with a spring-type dash-pot time delay. Inasmuch as such devices are well known in the art, they have not been illustrated in the drawing, but it will be readily understood that such a device can be adjusted so that the lid 14 of FIG. 1 will open to release the marker assembly when the vehicle descends to a predetermined depth (such, for example, as 200 feet) following a surface collision. An over-riding manual control can also be incorporated into this switch so as to permit operation of the mechanism at any time from within the vehicle itself.

As soon as the lid 14 opens, the marker assembly of FIG. 3 will rise to the surface due to the inherent buoyancy thereof, and on or prior to reaching the surface, the inflatable member 26 is filled with fluid from the generator 16 and the unit 30 oriented to act as a reflector of electromagnetic energy. It should be recognized at this point that, although a single marker assembly has been illustrated and described, a number of similar units may be employed each of which is stowed within a different portion of the vehicle and is independently released in the above-described manner in an emergency. The use of such additional units is of course optional, but they can be useful in the case of a large vehicle to indicate the respective locations of the forward, mid and aft portions thereof.

The cable 20 which is wound upon the reel 18 may be of any suitable construction but may, for example, comprise #302 stainless steel wire having a tensile stress of 140,000 p.s.i. Such wire is highly corrosion resistant and can tolerate heavy shocks such as might be introduced by large ocean currents. Although the length of the wire can vary between wide limits, a total length of 25,000 feet is adequate to permit satisfactory operation of the invention device in cases where the vehicle is at a maximum depth of approximately 20,000 feet. The cable 20 is designed to be resistant to shearing or rupture by the presence of the swivels 22, which are preferably located at intervals of 50 to 100 feet in order to pick up any excess shock and shear impact.

It should be noted that the cable reel 18 is located on the marker rather than on the sunken vehicle. Consequently, the cable is not drawn through the water as the reel 18 unwinds, and, since the reel is completely free from the vehicle during ascent of the marker assembly, there is very little likelihood of the cable 20 becoming ensnared in the vehicle's structural members.

As above mentioned, opening of the lid or cover 14 allows the marker assembly to rise to the surface by virtue of its own buoyancy. As soon as the surface has been reached, it is desired that fluid be injected into the inflatable member 26 so as to cause the latter to assume an essentially spherical configuration. This is somewhat schematically illustrated in FIGS. 1 and 2 of the drawings, where the inflatable member 26 is depicted as a meteorological balloon, and hence composed of flexible material of a non-porous nature. Within this meteorological balloon is the microwave reflector unit 30 of FIG. 3 which, when fully erected, is oriented in a manner schematically shown in FIG. 2 of the drawings by the broken lines 31a. Prior to assuming its erected configuration as shown by the broken lines in FIGURE 2, this radar reflector assembly in its collapsed condition lies in an essentially horizontal position such as illustrated by the broken lines 30 in FIGURE 3 of the drawings. As above mentioned, the showing of FIG. 3 represents that condition which exists while the marker unit is rising to the surface following its release from the compartment 12 of the vehicle 10. During this ascent, the reflector unit is collapsed and the meteorological balloon 26 deflated, both being contained within the upper compartment 32 of the foam-generating unit 16. This upper compartment 32 is closed by a cover plate 34 which is of the "snap-on" type and is released from its position such as shown in FIG. 3 upon erection of the reflector unit, such erection forcing the cover 34 away from the marker and permitting the meteorological balloon 26 to assume its spherical inflated form such as shown in FIGURES 1 and 2.

The reflector unit 30 is erected and balloon 26 inflated when the marker unit of the present invention has risen to the surface, as shown in FIGURES 1 and 2 of the drawings. The inflation of this balloon is carried out by means of a fluid generator which may be of a type the details of which are shown in FIGURE 3 of the drawings. Although the construction and operation of such a fluid-generating device is fully set forth in United States Patent No. 3,095,851 issued July 2, 1963, a brief description of the manner in which the fluid filling the balloon 26 is generated will now be given.

The unit 16 of FIG. 3 includes two chambers 36 and 38 which are disposed side-by-side as shown. Each of the chambers 36 and 38 is adapted to be filled with a particular chemical substance, and it is essential that these substances remain out of contact with one another until such time as the unit is activated to initiate its function of filling the balloon 26. The chamber 36 is provided with a pair of valves 40 and 42 as shown, while the chamber 38 is similarly provided with a pair of valves 44 and 46.

A further chamber 48 extends completely across the vapor generator 16 as shown in the drawing, and communicates with the chamber 36 through the normally-closed valve 42. Chamber 48 similarly communicates with chamber 38 through the normally-closed valve 46. A still further chamber 50 lies between the chamber 48 and one wall of the generator 16, this wall 52 having formed therein a plurality of water-soluble plugs 54 which are so designed as to disintegrate approximately at the time the vapor generator 16 reaches the surface of the body of water in which the vehicle 10 is submerged.

Chamber 50 is filled with a water-reactive chemical substance such, for example, as calcium chloride. Admission of water into the chamber 50 through the openings which were formerly filled by the plugs 54 (and which plugs have now dissolved) will produce an exothermic reaction, and heat is transmitted through the wall separating the chambers 48 and 50 to heat the material contained in chamber 48. This last-mentioned material may, for example, be a substance such as Freon, which, when heated, expands and creates a pressure to open the valves 42 and 46. Entry of this pressurized Freon into the chambers 36 and 38 then causes the valves 40 and 44 to open, and the two substances respectively contained in the chambers 36 and 38 are mixed together in the chamber 56. If the substance in chamber 36 is a polymer such as polyurethane, and if the substance in chamber 38 is a catalyst such as tolyl di-isocyanate, then the mixing of these two substances in chamber 56 will create a foam-like material. This foam-like material which has been mixed in chamber 56 is then forced outwardly through the nozzles 58 and 60 into the interior of the inflatable member 26 by the pressurizing action of the heated Freon from chamber 48. The inflatable balloon 26 will now begin to expand. At the same time, this emerging foam from the two nozzles 58 and 60 will act to release a retaining spring (not shown) which has retained in a substantially horizontal position (best shown in FIG. 3) the microwave reflector unit 30 which is made up of a plurality of planar members so interrelated as to lie flat against one another during the time that the balloon 26 is deflated, as indicated in FIG. 3. It is a feature of the present concept that the emergence of the pressurized foam generated in the manner hereinabove described from the nozzles 58 and 60 brings about an erection of this microwave reflector unit and a subsequent orientation of the various parts thereof such that the unit will act as an ideal reflector of microwave energy such as might be emitted by a search radar seeking the location of the disabled vehicle 10. The manner in which this result is achieved will now be set forth.

Figure 5:
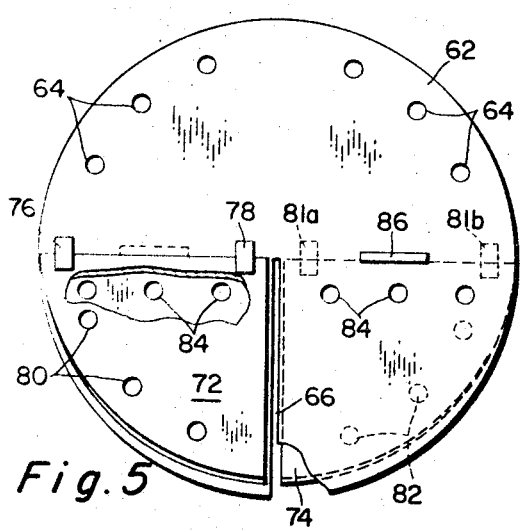
FIGS. 5 and 6 are plan views of the two radar-reflecting discs and their associated components, these discs, when assembled and properly oriented, having the final relationship illustrated in FIG. 4.
Figure 6:
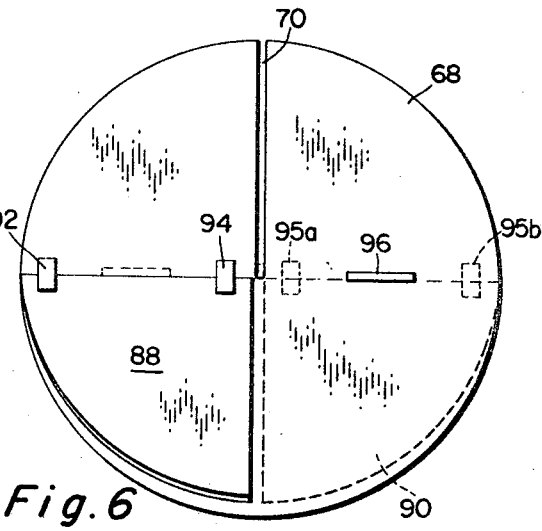

The reflecting unit 30 disposed within the collapsible member 26 (which unit is shown in its pre-erected position in FIG. 3 of the drawings) is made up primarily of a pair of disc-shaped components such as shown in FIGURES 5 and 6. Each of these discs of FIGURES 5 and 6 has the same peripheral dimension, and the discs are intended to interfit with one another so that each disc effectively bisects the other. These two discs (as well as the flaps of FIGURES 7 and 8 which are attached thereto and which will hereinafter be described) are fabricated from a material which provides structural rigidity together with minimum thickness, while possessing a surface such that the discs act as ideal reflectors of microwave energy. The disc 62 (as shown in FIG. 5) is formed with a plurality of apertures 64 in one portion thereof which constitutes are arcuate segment of approximately 180°, while the remaining 180° segment of the disc 62 is divided into two equal parts by a radially extending slit 66. The disc 68 of FIG. 6 has no apertures corresponding to the openings 64 in disc 62, but is provided with a slot 70 corresponding dimensionally to the slot 66 of the disc 62 but extending in a radial direction opposite to the slot 66, so that, taken together, the two slots 66 and 70 extend diametrically across the two discs 62 and 68 when these discs are interfitted as above described.

Figure 7:
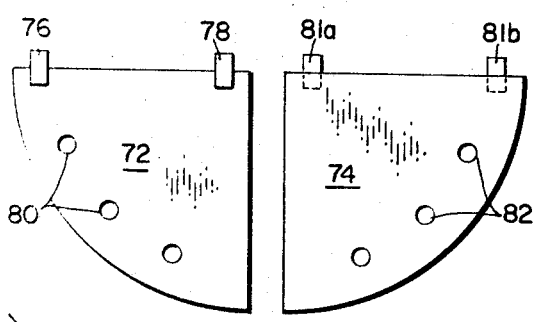
FIG. 7 is a plan view of the two flaps which are hinged to the disc of FIG. 5.
Figure 8:
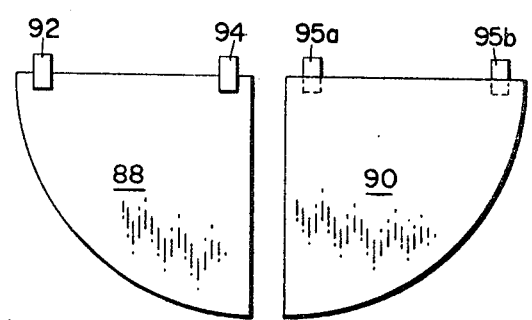
FIG. 8 is a plan view of the two flaps which are hinged to the disc of FIG. 6.

Attached to the disc 62 of FIG. 5 is a pair of flaps 72 and 74 as shown in FIG. 7 of the drawings. The flap 72 is hinged to the disc 62 by a pair of hinges 76 and 78 so that the flap 72 may be moved into a position to which it is essentially normal to the surface of the disc 62 in a manner to be later described. The flap 72 is also provided with a plurality of apertures 80 therein disposed as shown in FIG. 7 of the drawings. The flap 74 is also hinged at 81a and 81b to the disc 62 but on the opposite surface thereof from the flap 72. In FIG. 5 of the drawings the flap 74 is on the rear or back face of the disc 62 away from the observer. The disc 74 is likewise intended to assume a position essentially normal to the surface of disc 62 under conditions which will later be described. A plurality of apertures 82 are formed in the flap 74 corresponding to the apertures 80 in the flap 72, these apertures all being illustrated in FIG. 7 of the drawings.

In addition to the apertures 64 in disc 62 previously described, this disc is also formed with a further plurality of apertures 84 extending in an essentially linear fashion across the surface of disc 62 and which apertures are covered on one side by the two flaps 72 and 74 when these flaps lie in an essentially face-to-face relationship with the disc 62 as shown in FIG. 5. However, when the flaps 72 and 74 are brought into a position essentially normal to the surface of the disc 62, these openings 84 are uncovered and serve a purpose which will later become apparent. On the upper surface of the disc 62 (that is, that surface facing the observer) there is attached a "stop" member 86 designed to limit the movement of one of the flaps of the erected reflector unit of FIG. 4.

Referring now to the disc 68 of FIG. 6, this disc 68 does not have any apertures therein corresponding to those identified by the reference numerals 64 and 84 in FIG. 5 in the drawings, but does have attached thereto a pair of flaps 88 and 90 corresponding to the flaps 72 and 74 of FIG. 7. These flaps 88 and 90 are also devoid of openings therein. As shown in FIG. 6, the flap 88 is hinged to the disc 68 by a pair of hinges 92 and 94 corresponding to the hinges 76 and 78 of FIG. 5. The flap 90 is also hinged to the disc 68 at 95a and 95b but on the back or reverse side thereof as indicated by the broken lines in FIG. 6. A stop member 96 corresponding to the stop member 86 of FIG. 5 is also provided on the disc 68 for purposes to later become apparent. Each of these flaps 88 and 90 is designed to swing into a position where it is essentially normal to the surface of the disc 68 in the same manner as that of the flaps 72 and 74 of FIG. 7.

Figure 9:
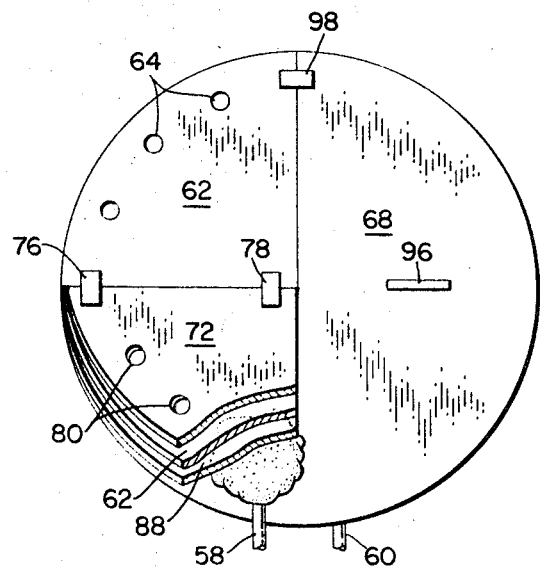
FIG. 9 illustrates the manner in which foam is ejected from one of the two nozzles shown in FIG. 3 into the space between the disc of FIG. 6 and one of its associated flaps when all of the assembled planar members are lying in essentially face-to-face relationship following erection of the reflector assembly to essentially vertical position.
Figure 10:
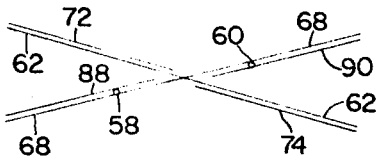
FIG. 10 is a schematic bottom view showing the relative position between the two foam nozzles of FIG. 3 and the various planar members during the initial phase of erection of certain flaps to an essentially horizontal position as shown in FIG. 4 of the drawings.

In assembling the reflector unit, the flaps 72 and 74 are attached to the disc 62 of FIG. 5 so that they are hinged thereto in the manner illustrated in the drawing, and the flaps 88 and 90 similarly attached to the disc 68. The two discs 62 and 68, to which the flaps 72, 74, 88 and 90 have been respectively attached, are now interleaved by inserting the slot 66 of disc 62 into the slot 70 of disc 68 so that the two discs 62 and 68 interfit with one another in relatively flat relationship. However, the relationship of discs 62 and 68 is such that the flexible nozzles 58 and 60 of FIG. 3 can project into the disc assembly in such fashion that the nozzle 58 lies between the disc 68 and the flap 88, while the nozzle 60 lies between the disc 68 and the flap 90. A diagrammatic relationship of the nozzles and planar members is illustrated in FIG. 10 of the drawings, while the manner in which the nozzle 58 lies between disc 68 and flap 88 is shown in both FIGS. 9 and 11.

Let it now be assumed that the marker of the present invention has been released from the disabled vehicle 10 and has risen to the surface of a body of water to assume a position such as shown in FIGS. 1 and 2 of the drawings. As above brought out, entry of water into the chamber 50 of FIG. 3 generates heat to pressurize the Freon in chamber 48 and hence causes a mixing in chamber 56 of the respective chemicals in chambers 36 and 38. The foam generated by the intermixing in chamber 56 is ejected through the respective nozzles 58 and 60 into the interior of the inflatable member 26. The ejection of this foam through the nozzles 58 and 60 in accordance with the present concept also brings about an erection and proper orientation of the planar reflector members described in FIGS. 4 through 13 of the drawings. The manner in which this erection is accomplished will now be described.

Figure 4:
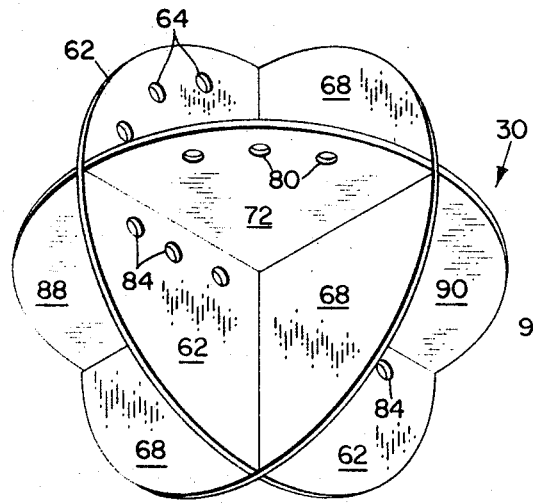
FIG. 4 is a perspective view of the collapsible radar-reflecting unit contained within the inflatable member of FIGS. 1 and 2, this reflecting assembly being shown in its final or erected condition.
Figure 12:
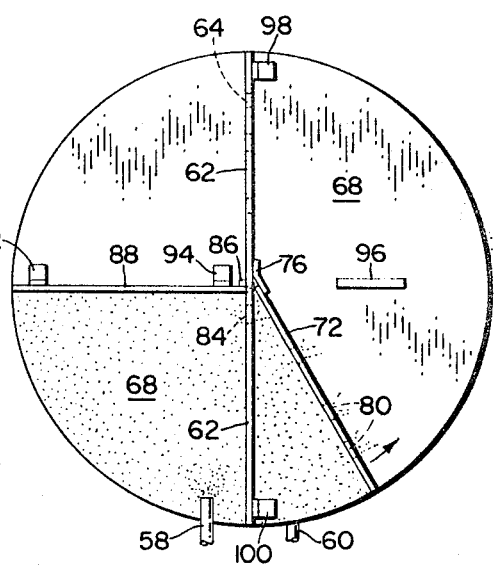
FIG. 12 shows the flap being erected in FIG. 11 in essentially horizontal position, and with foam being admitted to another quadrant so as to bring about activation of a further flap to essentially horizontal position as shown by the arrow.
Figure 13:
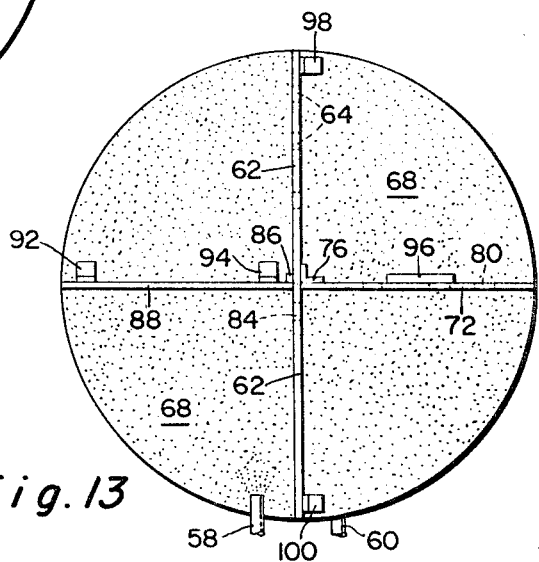
FIG. 13 is a view of the assembly after foam has completely filled the inflatable member of FIGS. 1 and 2 and the reflecting unit has all of its planar members oriented in the same manner shown in FIG. 4 of the drawings.
Figure 11:
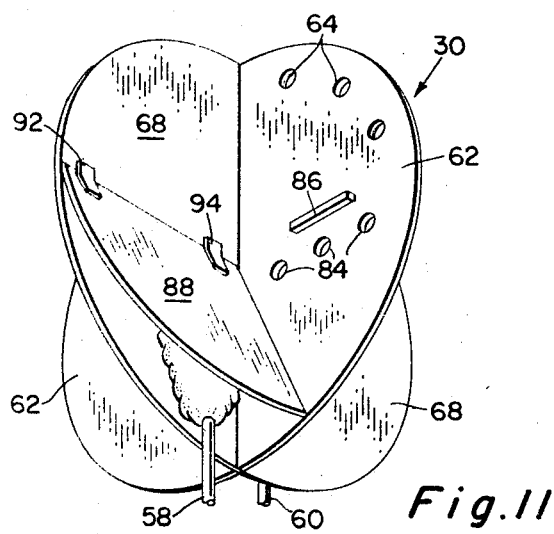
FIG. 11 shows the erection process of one flap at an intermediate stage, the two discs having separated so as to bear an essentially 90° relationship to one another.

It has been stated above that the initial ejection of foam through the nozzles 58 and 60 may release a catch mechanism (not shown) which has previously held the reflector assembly 30 in an essentially horizontal position as indicated by the broken lines in FIG. 3 of the drawings. Erection of this assembly to an essential vertical position in which the various planar members lie flat against one another permits foam from nozzle 58 to enter the space between the disc 68 and the flap 88 as shown in FIG. 9 of the drawings (see also the diagrammatic representation of FIG. 10). The force produced by ejection of this foam causes the flap 88 to move away from the surface of disc 68, as shown in FIG. 11 of the drawings, and this movement of the flap 88 forces the disc 62 away from an essential parallel relationship to disc 68 into a relationship with disc 68 of essentially 90°, as best shown in FIG. 11. Continued movement of the flap 88 due to impingement of the pressurized foam ejected from nozzle 58 thereon forces the flap 88 to contact the stop member 86, at which point movement of the flap 88 is halted. However, as is apparent from FIG. 11 of the drawings, the flap 88, by contacting stop 86, has now uncovered the apertures 84 in disc 62 to the flow of pressurized foam, and consequently this foam passes through the apertures 84. At this point the foam encounters the flap 72 which is hinged to the disc 62, and this flap 72 is now forced upwardly (in the drawings) as shown by the arrow in FIG. 12. This movement of flap 72 continues until movement of the flap is terminated by contact with the stop member 96, as again best shown in FIG. 12. This final condition is illustrated in FIG. 13 of the drawings. Inasmuch as the flap 72 is provided with the openings 80 therein, the pressurized foam passes through these openings 80 until it fills the upper right-hand quadrant of the assembly as shown in FIGURE 13 of the drawings. With the additional openings 64 formed in disc 62 (see FIG. 5), foam now passes through these openings 64 to fill the upper left hand quadrant of the assembly of FIG. 13, and hence all of the planar members (in this half portion of the complete assembly) are completely encapsulated in foam and have assumed their right angle relationship to one another as illustrated in FIG. 4 of the drawings. An exactly comparable process is brought about by foam emerging from the nozzle 60 to fill the remaining one-half portion of the complete reflector assembly.

The flexible balloon 26 is designed so that when fully inflated it will be essentially coextensive with the outer fully inflated it will be essentially coextensive with the outer peripheral dimensions of the reflector unit of FIG. 4, and hence the foam which brings about an erection of the reflector unit in the manner just described also fills the interior of the balloon 26. As above brought out, this foam ejected from the nozzles 58 and 60 is so composed as to harden after a short period of time and hence convert the entire reflector unit into a rigidized assembly which is not only impervious to moisture but also incapable of being deflated by puncturing or by weather conditions such as might be encountered during or prior to rescue operations.

Although a particular type of foam-generating apparatus has been illustrated in FIG. 3 of the drawings, it will be apparent that any suitable type of apparatus may be substituted therefore as long as a source of pressurized foam of the type herein described is available to fill the interior of the balloon 26, and which ejects with a sufficient force to bring about the sequential movement of the various portions of the reflector unit hereinabove described.

Under certain circumstances, it may be desirable to ensure that the two discs 62 and 68 assume a 90° relationship to one another following release of the catch which holds them in the horizontal position of FIG. 3. Although the pressure of the ejected foam is normally sufficient to bring this about, nevertheless the action of the emitted foam may be augmented by the operation of a pair of spring hinges 98 and 100 shown in FIGS. 9, 12 and 13 of the drawings. These spring hinges 98 and 100 are compressed when the reflector unit is collapsed as in FIG. 3, but act to separate the discs 62 and 68 as soon as the catch holding the unit in horizontal position has been released due to initial emergence of foam from nozzles 58 and 60 and the reflector members have assumed a vertical orientation.

It will be also understood that the remaining hinges pivotally securing the flaps 72, 74, 88 and 90 to their respective discs may also be spring loaded if desired so that the various planar members are urged into their final orientation as shown in FIG. 4 as soon as the chamber 32 has the cover plate 34 removed therefrom. This optional spring loading of all of the hinges may be set so as to limit the movement of the hinged flaps to a 90° relationship with the discs to which they are hinged, or, in the case of the hinges 98 and 100, to a 90° relationship of the two discs 62 and 68.

Obviously many modifications and variations of the present invention are possible in the light of the above teachings. It is therefore to be understood that within the scope of the appended claims the invention may be practiced otherwise than as specifically described.

What is claimed is:

1. An object-locating device in the form of an envelope of flexible material designed to be inflated and when so inflated to be of generally spherical configuration, said envelope containing therewithin a collapsible structure which is arranged during inflation of said envelope into a configuration in which it becomes an omnidirectional reflector of electromagnetic energy, said device comprising:
    a pair of essentially circular discs with similar peripheral dimensions within said envelope and lying initially in horizontal face-to-face relationship prior to inflation of said envelope;
    means effective at, or prior to, inflation of said envelope to bring about an erection of said pair of discs to an essentially vertical position in which they are articulable with respect to one another about an axis which constitutes a common diameter of the discs and which axis extends in a substantially vertical direction;
    two pairs of inter-disc flaps, one pair being hinged to one of said pair of discs on opposite sides thereof and along respective radii thereof, the other pair of flaps being hinged to the other of said pair of discs on opposite sides thereof and along respective radii thereof, all of said hinges lying in a single plane, each of said flaps lying parallel to the surface of the disc to which it is hinged prior to inflation of said envelope, each flap being movable to a position in which it is perpendicular to the surface of the disc to which it is hinged;
    stop means carried by each disc of said pair to limit further movement of each flap when the latter has reached a position perpendicular to the surface of the disc to which it is hinged;
    each disc of said pair having at least one opening formed therein adjacent to the respective positions assumed by the flaps hinged to the remaining disc of the pair when such flaps have reached a position perpendicular to the surface of such remaining disc, each of said openings being designed to pass fluid therethrough;
    a source of fluid; and
    means for admitting fluid from said source into said envelope so as to exert pressure on each flap of the pair hinged to one of said discs at a time when each such flap is lying parallel to said one disc, thereby causing each such flap to assume its said perpendicular position and in so doing force the two discs of said pair into a relationship in which they lie essentially at right angles to one another.

2. A device according to claim 1 in which said fluid is in the form of a plastic foam.

3. The combination of claim 2 in which said plastic foam has the property of hardening after filling said envelope so as to rigidize the energy-reflecting structure contained therewithin.

4. The combination of claim 3 in which said plastic foam comprises a mixture of a polymer and a catalyst.

5. The combination of claim 4 in which the polymer is polyurethane.

6. The combination of claim 4 in which the catalyst is tolyl di-isocyanate.

7. A method which comprises the step of establishing a sequenced operation of interrelated planar elements which when erected form adjacent partitioned enclosures from an initial collapsed condition of the assembly formed thereby, in which collapsed condition of the assembly all of said elements lie in respective planes disposed essentially parallel to one another, to a final erected state of the assembly, in which erected state a mutually perpendicular relationship between selected ones of the elements is established and maintained, said planar elements being confined within an envelope and such erection being accomplished by the introduction into said envelope of a plastic foam which, upon expansion, successively erects said elements, by passage successively through openings therein, from an erected envelope into an adjacent collapsed enclosure.

8. An inflatable chamber having an omnidirectional radar reflector erected therein during inflation comprising:
    a pair of articulated disc members with similar peripheral dimensions, said disc members being composed of inflexible material and having a common axis lying on the line of articulation of the members, said members, when erected, defining a sphere with four substantially equal sectors divided about a common vertical axis;
    interdisc partitions also composed of inflexible material and normally lying parallel to, and being respectively hinged to the surface of a disc member, each partition being movable to a position perpendicular to the disc to which it is hinged;
    an expendable fluid in the form of a plastic foam capable of hardening after a period of time;
    stop means to limit erection of each partition when it reaches a perpendicular position;
    said discs having adjacent said stop means a plurality of apertures therein to control flow of said fluid therethrough so that upon admittance of said fluid to said chamber, separation of the discs will occur due to the pressure of said fluid thereupon as well as movement of the partitions into disc-aligning position.

9. A water-borne radar reflector unit comprising:
    a radar corner reflector made up of a plurality of relatively inflexible planar members defining three mutually perpendicular, intersecting planes;
    a flexible container enclosing said corner reflector; and
    a cellular-type plastic material filling said container and effectively encapsulating said reflector,
    such that said container is rendered substantially impervious to water, and the reflector contained therewithin is rendered highly resistant to damage from any extrenal shock and/or impact received by said container.

10. A method of pin-pointing the location of a disabled vehicle submerged in a body of water in order to facilitate the recovery thereof, said method comprising:
    releasing from said disabled vehicle a buoyant marker assembly which is tethered to said vehicle, whereupon said marker assembly rises to the surface of said body of water due to its buoyancy;
    generating a mass of plastic foam within said marker assembly when the latter has reached the surface of said body of water;
    admitting the plastic foam so generated to the interior of a flexible container containing an erectable radar reflecting unit, the foam thus admitted serving to orient said unit and render it capable of reflecting radar energy which may be incident thereupon; and
    allowing the plastic foam to harden when it has filled said container so as to render said container moisture-resistant and to rigidize the reflecting unit enclosed therewithin.

(References on following page)

References Cited

UNITED STATES PATENTS

| | | | |
|---|---|---|---|
| 2,475,633 | 7/1949 | Morris et al. | 343—18 |
| 2,778,010 | 1/1957 | Leonard | 343—18 |
| 2,885,670 | 5/1959 | Kirgan | 343—18 |
| 2,888,675 | 5/1959 | Pratt et al. | 343—18 |
| 2,912,687 | 11/1959 | Leonard | 343—18 |
| 3,229,291 | 1/1966 | Dell'Aria et al. | 343—18 |
| 3,229,292 | 1/1966 | Dell'Aria et al. | 343—18 |
| 3,326,624 | 6/1967 | Von Maydell et al. | 343—915 X |

RODNEY D. BENNETT, Jr., *Primary Examiner.*

B. L. RIBANDO, *Assistant Examiner.*

U.S. Cl. X.R.

343—915